US009118867B2

(12) United States Patent
McCary

(10) Patent No.: US 9,118,867 B2
(45) Date of Patent: Aug. 25, 2015

(54) DIGITAL RADIO PRODUCING, BROADCASTING AND RECEIVING SONGS WITH LYRICS

(76) Inventor: John M. McCary, Birmingham, AL (US)

( * ) Notice: Subject to any disclaimer, the term of this patent is extended or adjusted under 35 U.S.C. 154(b) by 29 days.

(21) Appl. No.: 13/506,981

(22) Filed: May 30, 2012

(65) Prior Publication Data

US 2013/0322514 A1    Dec. 5, 2013

(51) Int. Cl.
  *H04N 5/445* (2011.01)
  *H04H 40/90* (2008.01)
  *H04H 60/07* (2008.01)
  *H04H 60/74* (2008.01)

(52) U.S. Cl.
  CPC ............. *H04N 5/445* (2013.01); *H04H 40/90* (2013.01); *H04H 60/07* (2013.01); *H04H 60/74* (2013.01)

(58) Field of Classification Search
  USPC .................. 84/600–602; 434/307 A; 700/94; 455/3.06
  See application file for complete search history.

(56) References Cited

U.S. PATENT DOCUMENTS

| | | | | |
|---|---|---|---|---|
| 5,161,251 A | * | 11/1992 | Mankovitz | 455/66.1 |
| 5,212,551 A | * | 5/1993 | Conanan | 348/484 |
| 5,214,792 A | * | 5/1993 | Alwadish | 455/45 |
| 5,408,686 A | * | 4/1995 | Mankovitz | 455/66.1 |
| 5,465,240 A | * | 11/1995 | Mankovitz | 369/1 |
| 5,526,284 A | * | 6/1996 | Mankovitz | 455/66.1 |
| 5,561,849 A | * | 10/1996 | Mankovitz | 455/45 |
| 5,689,081 A | * | 11/1997 | Tsurumi | 84/609 |
| 5,777,997 A | * | 7/1998 | Kahn et al. | 370/493 |
| 5,886,275 A | * | 3/1999 | Kato et al. | 84/609 |
| 5,900,566 A | * | 5/1999 | Mino et al. | 84/610 |
| 6,062,867 A | * | 5/2000 | Torimura | 434/307 A |
| 6,062,868 A | * | 5/2000 | Toriumi | 434/307 A |
| 6,074,215 A | * | 6/2000 | Tsurumi | 434/307 A |
| RE37,131 E | * | 4/2001 | Mankovitz | 455/66.1 |
| 6,442,517 B1 | * | 8/2002 | Miller et al. | 704/201 |
| 6,462,264 B1 | * | 10/2002 | Elam | 84/645 |
| 6,990,312 B1 | * | 1/2006 | Gioscia et al. | 455/3.06 |
| D518,017 S | * | 3/2006 | Lavoie et al. | D14/509 |
| 7,142,807 B2 | * | 11/2006 | Lee | 455/3.01 |
| 7,444,353 B1 | * | 10/2008 | Chen et al. | 1/1 |
| 8,024,649 B1 | * | 9/2011 | Morio et al. | 715/201 |
| 8,143,508 B2 | * | 3/2012 | Jean et al. | 84/600 |

(Continued)

*Primary Examiner* — David Warren

(57) ABSTRACT

A system and means for the proprietary data stream format encoding of songs with lyrics in a digital radio broadcasts in a produced data stream that can be individually distributed to terrestrial and satellite digital radio broadcasters. The proprietary pre-encoding of song information with possible PAD data (Program Associated Data), song and lyrics (EISL) where the proprietary encoding allows the bit rate to be sized by the Producer to fit the fixed bit rate of the channel's Data Service, while sound and video quality is still maximized. The EISL can be converted to analog for simultaneous transmission (only audio received in analog mode). The digital radio Broadcasters do not have to make significant expenditures to broadcast the EISL data stream. There can be various different digital radio/receiver configurations to adapt to the listener/customer's needs/budget to receive the EISL transmission. The digital receiver with channel decoder, EISL source decoder with video and audio component extractor, plus amplifier/speakers and display screen(s) can be one unit or separate components of the EISL digital receiving system. EISL transmissions can be received by non-EISL enabled digital receivers and songs heard and PAD data displayed on the channel/mode display. Non-EISL digital radio song transmissions can be received and song heard and PAD data displayed.

8 Claims, 5 Drawing Sheets

(56) References Cited

U.S. PATENT DOCUMENTS

| | | | |
|---|---|---|---|
| 8,407,752 B2* | 3/2013 | Levy et al. | 725/113 |
| 8,589,506 B2* | 11/2013 | Morio et al. | 709/217 |
| 2002/0193895 A1* | 12/2002 | Qian et al. | 700/94 |
| 2003/0084108 A1* | 5/2003 | Syed | 709/206 |
| 2004/0116069 A1* | 6/2004 | Fadavi-Ardekani et al. | 455/3.02 |
| 2004/0249862 A1* | 12/2004 | Shin et al. | 707/104.1 |
| 2005/0239402 A1* | 10/2005 | Gioscia et al. | 455/3.06 |
| 2007/0123236 A1* | 5/2007 | Rey et al. | 455/414.4 |
| 2007/0300281 A1* | 12/2007 | Lee | 725/135 |
| 2008/0097754 A1* | 4/2008 | Goto et al. | 704/214 |
| 2008/0246590 A1* | 10/2008 | Lee | 340/10.51 |
| 2008/0274687 A1* | 11/2008 | Roberts et al. | 455/3.06 |
| 2009/0060458 A1* | 3/2009 | Bauchot et al. | 386/102 |
| 2009/0083281 A1* | 3/2009 | Sarig et al. | 707/10 |
| 2009/0089836 A1* | 4/2009 | Lee et al. | 725/39 |
| 2009/0128335 A1* | 5/2009 | Leung | 340/572.1 |
| 2009/0205000 A1* | 8/2009 | Christensen et al. | 725/61 |
| 2010/0198944 A1* | 8/2010 | Ho et al. | 709/217 |
| 2011/0124283 A1* | 5/2011 | DeLuca | 455/3.06 |
| 2011/0275320 A1* | 11/2011 | Pattenden | 455/41.2 |
| 2012/0189069 A1* | 7/2012 | Iannuzzelli et al. | 375/259 |
| 2013/0042293 A1* | 2/2013 | Wang | 725/137 |
| 2013/0102242 A1* | 4/2013 | Anzures et al. | 455/3.06 |

* cited by examiner

DIGITAL RADIO PRODUCING, BROADCASTING AND RECEIVING SONGS WITH LYRICS

BACKGROUND OF THE INVENTION

Many wireless digital broadcast services are available to the public which include terrestrial digital radio, such as HD Radio and satellite radio, such as XM Radio. Many of the terrestrial radio broadcasters are either independently owned or are individually programmed/formatted all or part of the day. Most digital broadcasters are on a limited budget and are looking for ways to promote and expand their digital listeners, especially with increasing internet and TV/cable competition.

HD Radio stations have spent a great amount on licensing fees and equipment to upgrade or built new facilities to become a digital radio broadcaster and are looking for ways to bring new customer/listeners to HD Radio. Also the possible new HD Radio user would have to purchase a digital capable receiver/radio to listen to HD Radio. HD Radio broadcasters can broadcast in various kilobit rates and may have multiple channels with each channel on a different kilobit rate. X M customers also have to purchase a satellite digital capable receiver/radio plus pay fees to listen to X M Radio. The X M Radio satellite network has been quite expensive to construct. Currently these digital broadcasters broadcast songs with display of information about the song played such as song title, artist and possibly album information. However, these digital radio broadcasts could be enhanced by the transmission and display of songs with lyrics also displayed which would be entertaining and possibly educational. Also, there is no current means to broadcast and receive digital radio simultaneously transmitted song with displayed lyrics.

In U.S. Pat. No. 8,121,534, Mantel, et al, have a very complicated and expensive system that a digital radio network may use "in house" to insert images into a data stream of a digital radio transmission. Mantel's system does not produce a song with lyric data stream that is specifically produced for nonaffiliated independent broadcasters where the bitstream format is encoded for each broadcaster and encoded for receiver/decoder equipment requirements. Most digital radio broadcasters cannot afford the time; not have the technical ability nor could they usually afford to produce numerous songs with lyrics in digital data streams and/or produce them in the various bit rate sizes for the various Data Services fixed bit rate. Many, if not most, digital radio/receiver channel/mode displays are small or the pixel rate is very low that even though these displays can be used to view the song lyrics they are somewhat inadequate in viewing the image flow of song lyrics with enhanced lyric presentation backgrounds.

When there is a digital radio broadcast in a moving vehicle there needs to be a way for the driver to view the channel/mode display with the PAD data (Program Associated Data), that gives information about the song such as title, artist and maybe album, but the driver does not need to view the display distraction of continually changing lyrics. What is needed is a non-complicated and economical means to digitally produce, broadcast and receive songs with the song's lyrics in such a manner that would compliment and not interfere with current broadcasting and receiving of digital radio transmissions and would be formatted to allow for vehicle viewing safety standards.

SUMMARY OF THE INVENTION

This invention consists of a proprietary formatted pre-encoded data stream consisting of: PAD data (Program Associated Data); song with lyrics; with possible other added information or Encoded Information Song with Lyrics (EISL) data stream that is produced and distributed to digital radio broadcasters. The pre-encoded EISL's data bit stream is sized to fit into the fixed rate of the digital broadcaster's Data Service. When the digital broadcaster broadcasts the EISL is received by an EISL enabled digital receiver/decoder. The digital receiver has an antenna that receives the over the air signal and moves the data to a tuning receiver and then the data is moved to a channel decoder which converts the signal into a bitstream plus lets the user possibly know that the channel transmission is an EISL transmission. Next the bitstream is sent to a source decoder which separates the audio/song data and the video/lyrics with song data in the bitstream. The audio components are sent to a proprietary audio decoder and then the audio data is sent to amplifier/speakers, earphones or possible storage device. The song and information components are extracted and sent to a proprietary image decoder which converts the data into a format that allows the video/lyric to be displayed such that the video data may be split where the PAD data may be sent to the channel/mode display and/or to the lyrics display screen. When an EISL enabled receiver/decoder receives an EISL song transmission, such as in a car or other vehicle, the smaller channel/mode display will show the PAD data and the lyrics are viewed on a separate larger, higher pixel display screen. The proprietary encoding of the EISL will not let the lyrics be displayed upon on the channel/mode display (the radio/receiver display that the driver can view) when the EISL is received on a vehicle radio/receiver.

If an EISL song is received by a non-EISL radio/receiver the audio/song is sent to the amp/speakers and PAD data is displayed on the receiver channel/mode display. Also, when a non-EISL digital broadcast song is received by an EISL enabled receiver/decoder the audio/song is sent to the amp/speaker or earphones and the PAD is displayed on the channel display, if present, and possibly on the lyric display.

The invention of the proprietary pre-encoded EISL is the reverse of Mantel, U.S. Pat. No. 8,121,534 where Mantel is used for internal production in a network and there is no song/lyric specific production means. Also Mantel provides no means to distribute specifically encoded song/lyric data streams to individual broadcasters or there is no receiver decoding or equipment configurations to meet the listener/customer needs. In the invention the EISL is primarily independently produced and then distributed to various digital radio broadcasters. Also the EISL is specifically encoded and designed to be received by EISL and non-EISL receivers in various radio/receiver equipment configurations. In Jean, et al, U.S. Pat. No. 8,143,508, the streaming music with lyrics is designed for the internet where a server can be accessed by the user and then the user charged for accessing the data. In the invention the Producer produces proprietary encoded song with lyric data streams specifically designed for digital radio broadcasting and receiving.

In the illustrative embodiments of the invention further is described in producing/distributing, broadcasting and receiving the EISL and other associated transmissions is further described.

DETAILED DESCRIPTION OF THE PREFERRED EMBODIMENTS

Figure 1:
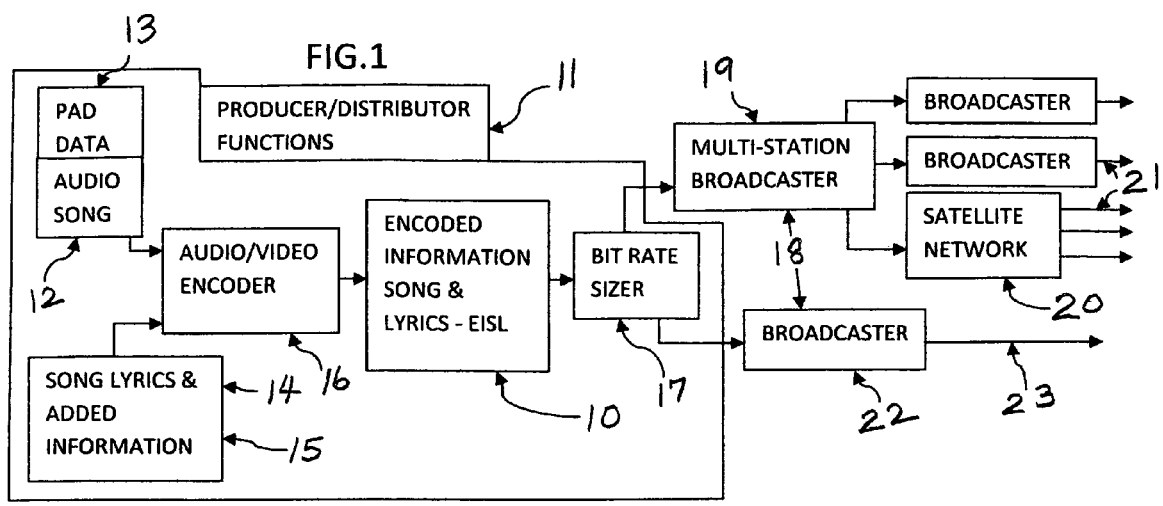
FIG. 1 is a block diagram of an illustrative embodiment of the system and method for producing, distributing and broadcasting digitally radio encoded information, song and lyrics (EISL) data stream.

FIG. 1 shows in a block diagram illustration the production, distribution and broadcasting means of the Encoded Information Song with Lyrics (EISL) 10. The production starts at the Producer/Distributor 11 with the audio/song 12 with the PAD data (Program Associated Data) 13 being encoded with the song lyrics 14 and any added song information 15 by the audio/video encoder 16 to produce the proprietary encoded information, song with lyrics (EISL) 10 data stream. The EISL 10 is then sized, if needed, by the bit rate sizer 17. The EISL can then be sent either physically, by internet or transmitted to the digital radio Broadcaster(s) 18. The Broadcaster 18 may be a multi-station terrestrial Broadcaster 19 or a satellite network 20, which sends the EISL either to other stations or satellites 21, or an individual or smaller Broadcaster 22 that might directly broadcast 23 the EISL.

Figure 2:
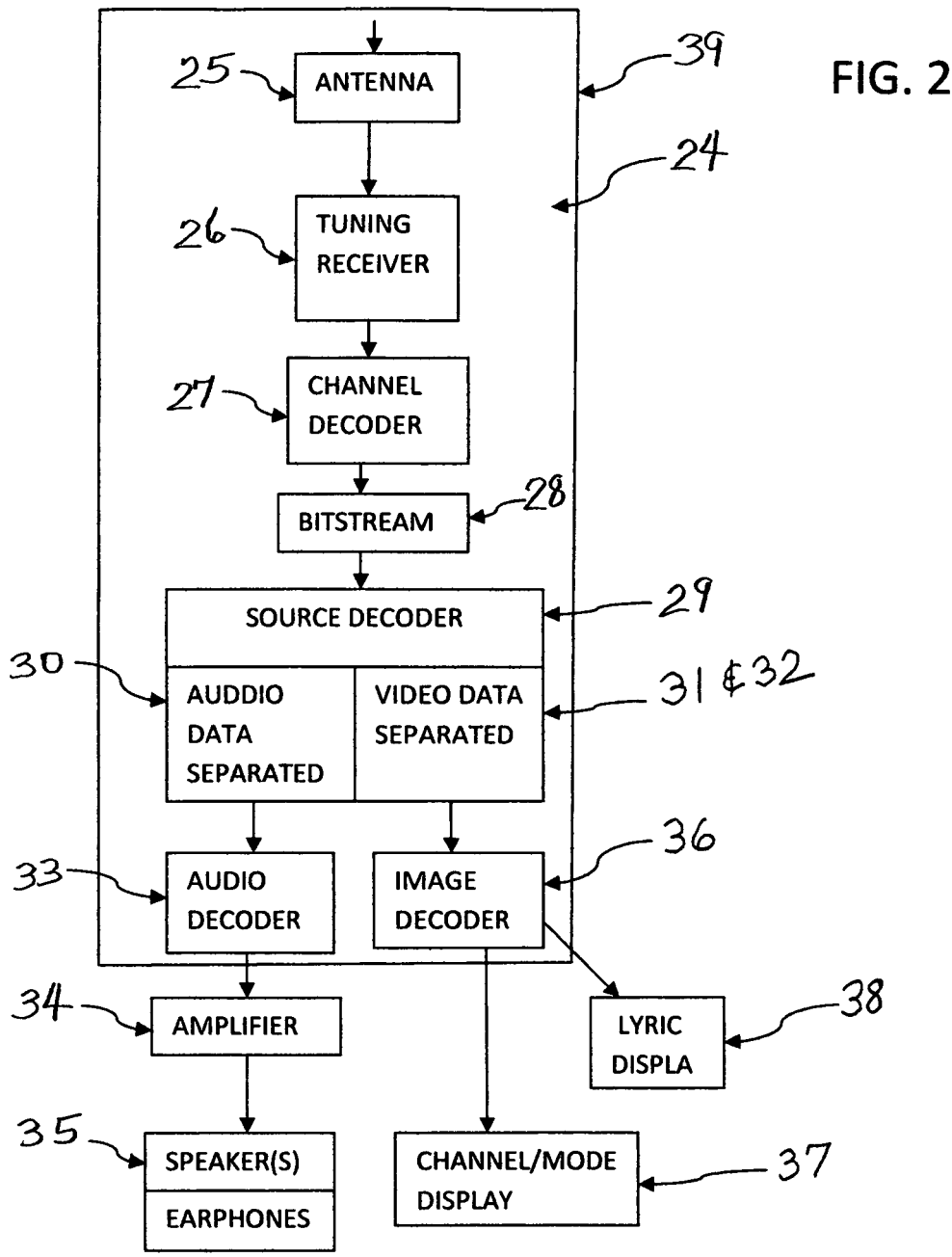
FIG. 2 is a block diagram of an illustration of a digital radio receiver receiving an EISL data transmission where the digital receiver/decoder is a separate unit from amplifier/speakers and display screen.

FIGS. 2 through 5 show various different block diagram of the EISL enabled and non-enabled receivers and various equipment configurations. In FIG. 2, the EISL receiver/decoder embodiment 24 has an antenna 25 that receives the over the air signal and then the received data moves through the tuning receiver 26 to a channel decoder 27 which converts the signal into a bitstream 28. Next the EISL bitstream 28 is sent to the EISL source decoder 29 which separates the audio data 30 and video/lyrics 31 with song information data 32 components in the bitstream. The audio data is sent to an audio decoder 33 first and then to an amplifier 34 and speakers and/or earphones 35. The video data is sent to an image decoder 36 and then the video data is sent possibly to a channel/mode display 37 and/or a lyric display 38. The receiver/decoder 24 that is enclosed in the outlined boxed receiver unit 39 is one unit. This EISL receiver/decoder embodiment 24 is a very useful equipment configuration where the receiving unit 39 can be an addition to most non-EISL enabled audio/amplified system where the digitally received and decoded audio may go into the "in audio", the "mp3 in", or maybe "accessory or auxiliary in" of the system and the video can be displayed on a TV screen, karaoke machine, mobile device, computer screen or independent display screen. In automotive or other mobile transportation application the above EISL receiver/decoder unit 39 may be able to be connected to the existing DVD player with display screen(s).

Figure 3:
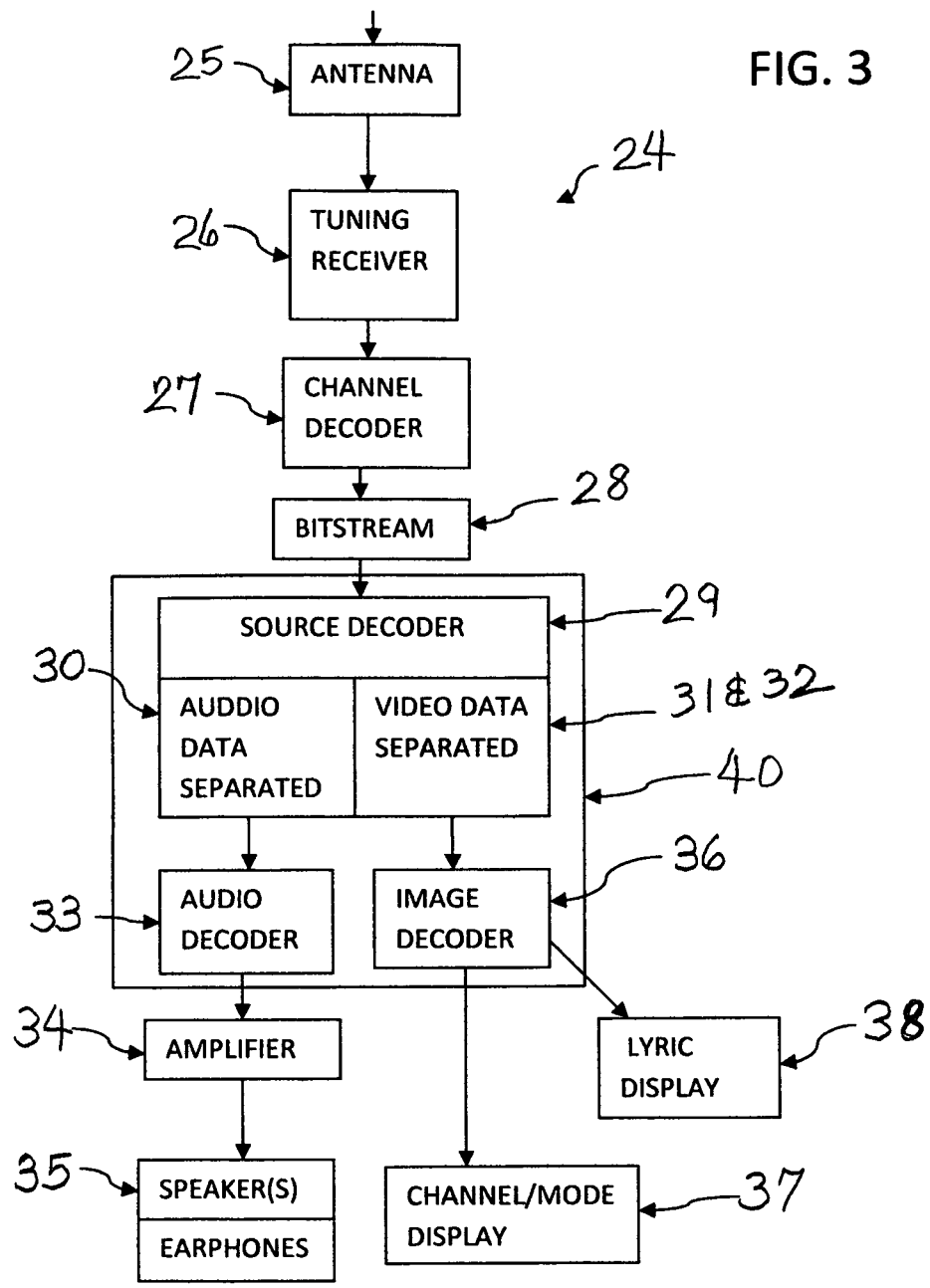
FIG. 3 is a block diagram of an illustration of a non-EISL enabled digital radio receiver receiving an EISL transmission where the source decoder, audio decoder and image decoder is a separate unit from the receiver, the amplifier/speakers and the lyric display screen.

Shown in FIG. 3 in a block diagram is another EISL embodiment 24 where a non-EISL enabled receiver can receive an EISL transmission. Shown are the receiver antenna 25, tuning receiver 26, and channel decoder 27 which is separate from the source decoder 29, audio decoder 33 and image decoder 36 which is one unit 40. The channel decoded 27 data that is sent to the EISL source decoder 29 separates the audio data 30 from the video/lyric 31 data. The audio data could be sent back to the amplifier 34 after passing through the source decoder 29 un-decoded or the source decoder could be set to decode the audio by the audio decoder 33 and back to the amplifier 34, which ever works best for the sound system. The video data from the source decoder 29 is sent to the image decoder where the song lyrics and/or PAD data may be sent to a channel/mode display 37 with song lyrics and other song information may be sent to a lyric display 38.

Figure 4:
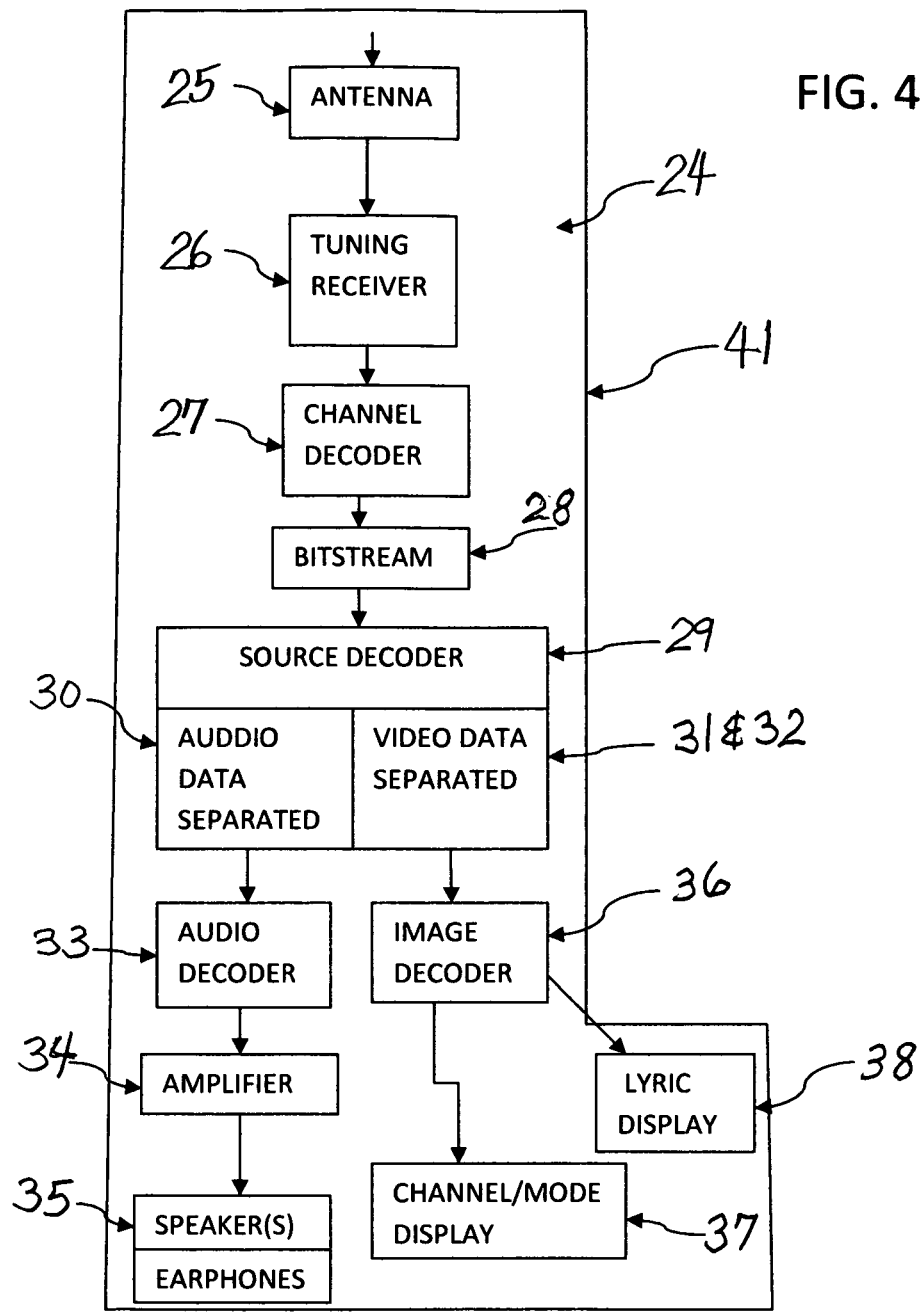
FIG. 4 is also a block diagram illustrating a transmission to EISL enabled digital radio receiver/decoder with speakers and lyric display screen as part of the receiver/decoder unit.

Further in FIG. 4 the block diagram shows another EISL embodiment 24 embodying an EISL enabled receiver/decoder 41 where the antenna 25, the tuning receiver 26, channel decoder 27, source decoder 29, audio decoder 33 and image decoder 36 plus amplifier 34, speakers 35, possible channel/mode display 37 and lyric display screen 38 are one unit. This configuration is basically a digital displayed EISL enabled receiver/amplifier which may have many of the same features as a Karaoke style machine except the song/lyric data comes from a digital radio broadcast.

Figure 5:
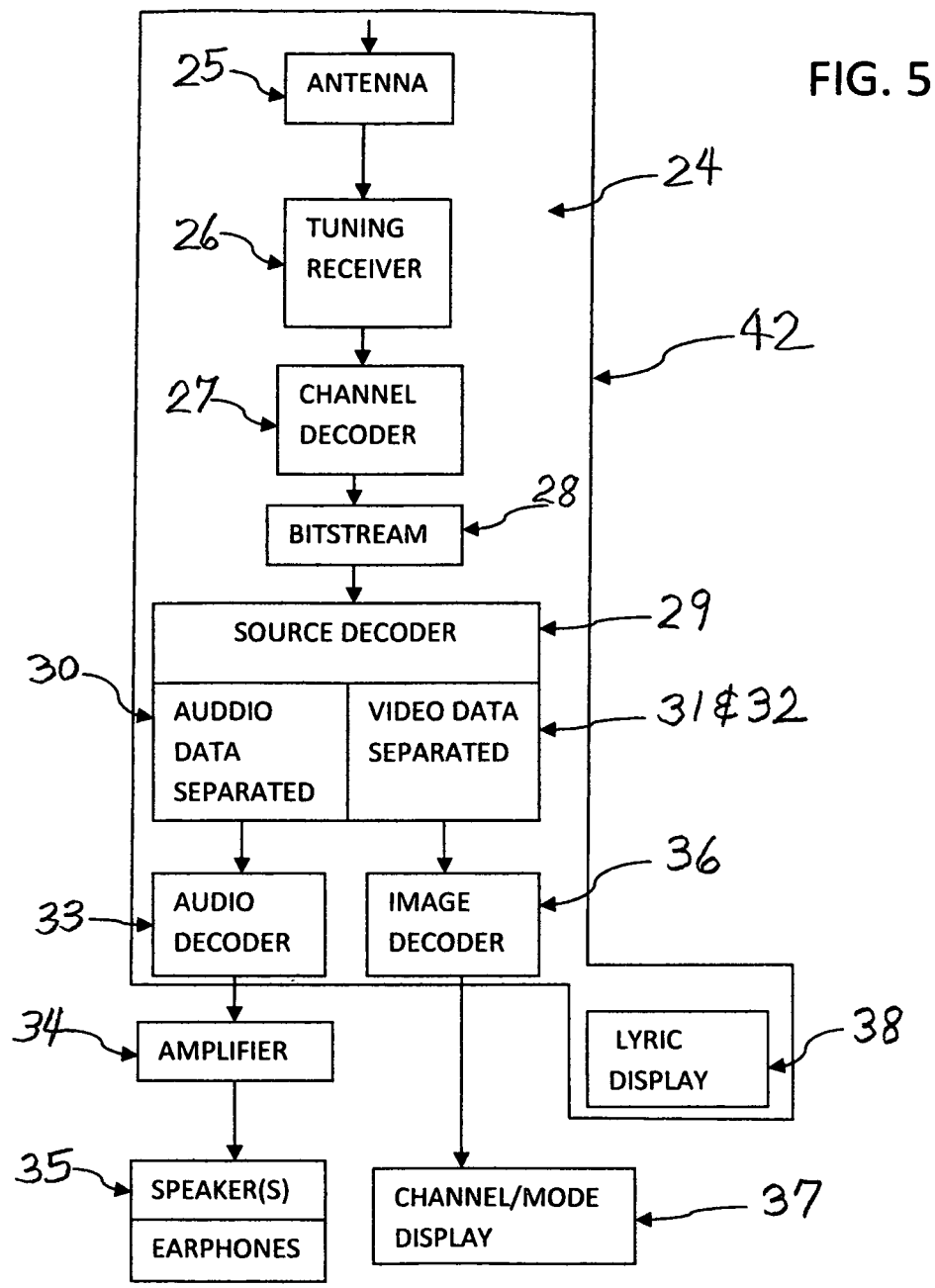
FIG. 5 shows in a block diagram a digital radio receiver/decoder receiving an EISL transmission where the display screen is part of the receiver/decoder unit but the amplifier/speakers are separate.

FIG. 5 shows in a block diagram another configuration of an EISL use embodiment 24 where the EISL enabled receiver/decoder 42 is an addition to an existing audio/video system, such as being used in a vehicle/transportation application. Here again as in FIGS. 2 and 3 the display screen(s) need to placed where driver viewing, while driving, is minimized for safety considerations. The antenna 25, tuning receiver 26, channel decoder 27, source decoder 29, audio decoder 33, image decoder 36, channel/mode display 37 are shown along with lyric display screen(s) 28 are included in the EISL enabled receiver/decoder unit 42. The radio/receiver display screen 43 showing the station, song, artist and other PAD information is shown. The audio data 30 can be sent to the amplifier 34 and then to the speakers 35 of the possible already existing or installed auto radio, CD, DVD or other audio/video unit.

The present invention has been described herein with reference to various embodiments of production, distribution, broadcasting and receiving. Those having ordinary skills in the art and access to the present methods and means will recognize additional modifications, applications and embodiments within the scope thereof. It is the intention of the attached claims to cover any and all such applications, modifications and embodiments within the scope of the present invention.

The invention claimed is:

1. A method to produce, broadcast, and receive wirelessly transmitted digital song data stream packages over-the-air,
    encoding a producing entity's data stream package so as to contain audio data and song lyrics data to be simultaneously displayed therewith,
    creating a reserved data space in the producing entity's encoded data stream package
    distributing the producing entity's encoded data stream package to a digital radio broadcasting entity,
    providing the broadcasting entity the ability to add additional broadcaster information data to the reserved data space,
    receiving, amplifying, storing and/or displaying the audio data, song lyrics, and additional broadcaster information data,
    wherein the producing entity and broadcasting entity are separate entities.

2. The method of claim 1, wherein the digital radio broadcasting entity includes terrestrial and/or satellite wireless digital transmission.

3. The method of claim 1, wherein the additional broadcaster information data added to the reserved space is audio and/or video data.

4. The method of claim 3, wherein the audio and/or video data includes broadcast advertising, promotions and/or other added information data.

5. The method of claim 1, wherein the additional broadcaster information data is placed into the reserved data space before and/or during the broadcast transmission of the lyrics.

6. The method of claim 1, wherein the producing entity's data stream package encoding compresses each data stream package, including the reserved data space, to be sized wherein a bit rate of the data stream package does not exceed a fixed bit rate for a data service channel of the broadcasting entity and maximizes sound and video broadcast quality with each bit rate sized for each broadcasting entity.

7. The method of claim 1, wherein the broadcasting entity can convert the song lyrics and additional broadcaster information data to an analog signal for simultaneous transmission with the digital transmission.

8. The method of claim 1, wherein the producing entity's encoded data stream and the additional broadcaster information data can be received by a digital radio receiver, comprising:
 a. receiving the digital radio signal by a digital radio antenna and sending the received signal to a tuning receiver;
 b. sending data from the tuning receiver to a channel decoder and converting the signal to a bit stream;
 c. decoding the bit stream by a receiver source decoder which separates the song lyrics data and video data, if any, in the additional broadcaster information data from the audio data, including any audio data in the bit stream added by the broadcasting entity;
 d. sending the audio data to a formatted audio decoder
 e. sending data from the audio decoder to an amplifier, speakers, earphones, and/or a storage device;
 f. sending the video data from the source decoder to the image decoder for converting the song lyrics data and video, if any, into a format such that the data can be displayed; and,
 g. allowing, by the producing entity's format, to display song lyrics and video, if any, on a display screen.

* * * * *